UNITED STATES PATENT OFFICE.

OMAR T. JOSLIN, OF CHICAGO, ILLINOIS.

PROCESS OF MAKING FERTILIZER FROM TANK-WATER.

SPECIFICATION forming part of Letters Patent No. 495,042, dated April 11, 1893.

Application filed September 28, 1891. Serial No. 407,004. (No specimens.)

*To all whom it may concern:*

Be it known that I, OMAR T. JOSLIN, a citizen of the United States, residing at Chicago, in the county of Cook and State of Illinois, have invented a certain new and Improved Process of Treating Tank-Waters, of which the following is a full, clear, and exact description.

My invention relates to processes of treating tank waters to recover their nitrogenous constituents in suitable form for use as commercial fertilizers. In order to render the nitrogenous compounds fit for such use, it is necessary that they should be as little hygroscopic as possible, and it is the object of my invention to provide a new and improved process of treating tank waters whereby the hygroscopic property of the constitutents of the tank waters may be easily and almost entirely eliminated, and the percentage of nitrogenous compounds in the product maintained at as high a point as possible.

I accomplish my object as follows:—The tank waters are first reduced to a sirupy condition by evaporating them in the usual manner, and to this sirup is then added from five to ten per cent. of sulphuric acid or muriatic acid, aqueous solutions of the acid being preferably used. The acids act to alter the constitution of the sirup and to precipitate certain albuminous matters. To the compound thus formed is then added from five to thirteen per cent. of a concentrated solution of the sulphates of aluminum, iron, magnesium and calcium, approximately in the following proportions: twelve per cent. ferric oxide; fifteen per cent. aluminum oxide; three per cent. calcium oxide; three per cent. magnesium oxide. I obtain this mixture by dissolving waste fuller's earth in sulphuric acid, filtering off the insoluble silica and evaporating the resulting solution of sulphates. The resulting product is then dried in pans placed in suitable ovens, which are heated to from 300° to 350°; the dried mass is then ground to a powder, when it is ready for use.

If desired, instead of using the sulphate solution alone, as above described, from twenty to forty per cent. of dried ground tankage, or hoofs, horn, hair, or pressed cooked blood may also be added, and in such case a still smaller proportionate amount of the sulphate solution need be used.

The decomposition of the sirup, resulting from the addition of sulphuric or muriatic acid before adding the sulphate solution, alters its nature so that a smaller proportionate amount of the sulphate solution is necessary, and, although the compounds which compose the solution are of value themselves as fertilizers, it is desirable that the amount introduced should be as small as possible so that the percentage of ammoniates or nitrogenous compounds will be greater.

As will appear from the preceding description, the sulphates used by me contain about twenty two per cent. of the sulphates of calcium and magnesium, the ratio of the oxides being about twenty seven per cent. of ferric oxide and aluminum oxide to about six per cent. of calcium oxide and magnesium oxide. The sulphates of lime and magnesia do not chemically combine with the nitrogenous matter, as do the sulphates of iron and aluminum, but as they are absorbents of moisture and the nitrogenous matter is insoluble in their solution, they are practically an equivalent for like quantities of the iron and alum salts, so far as rendering the product non-hygroscopic is concerned. Another advantage of using this mixture of sulphates instead of using sulphates of iron and aluminum without the calcium and magnesium is due to the fact that the sulphates of lime and magnesia are in themselves plant-foods, which is not true of sulphate of aluminum, and is true of sulphate of iron only to a small extent. An additional advantage lies in the fact that sulphates of calcium and magnesium in an unaltered molecular condition when put into the earth as an integral part of the finished fertilizer are absorbents of ammonia, and their presence tends to conserve any surplus of that product not immediately demanded by the growing plants as it is freed by the decay of the nitrogenous matter.

It will be understood that either sulphuric or muriatic acid may be used to decompose the sirup and precipitate the albuminous matters.

That which I claim as new, and desire to secure by Letters Patent, is—

1. The process of treating tank waters which consists in decomposing the waters, then adding a solution formed by dissolving waste fuller's earth in sulphuric acid, and then drying the product, substantially as described.

2. The process of treating tank waters which consists in adding sulphuric acid, then adding a solution formed by dissolving waste fuller's earth in sulphuric acid, then adding from twenty to forty per cent. of dried ground tankage, and then drying the product, substantially as described.

3. The process of treating tank waters which consists in decomposing the waters by the addition of sulphuric acid, then adding a solution of the sulphates of iron, aluminum, calcium, and magnesium and then drying the product, substantially as described.

4. The process of treating tank waters which consists in decomposing the waters by the addition of sulphuric acid, then adding from five to thirteen per cent. of a concentrated solution formed by dissolving waste fuller's earth in sulphuric acid, and then drying the product, substantially as described.

5. The process of treating tank waters which consists in decomposing the waters by the addition of sulphuric acid, then adding from five to thirteen per cent. of a concentrated solution formed by dissolving waste fuller's earth in sulphuric acid, and then drying the product at a temperature of from 300° to 350° Fahrenheit, substantially as described.

OMAR T. JOSLIN.

Witnesses:
JOHN L. JACKSON,
ALBERT H. ADAMS.